United States Patent [19]

Blasey

[11] Patent Number: 4,561,423
[45] Date of Patent: Dec. 31, 1985

[54] SOLAR PARABOLIC COLLECTOR

[76] Inventor: Dennis R. Blasey, 2365 Pauline Ave., Sparks, Nev. 89431

[21] Appl. No.: 619,188

[22] Filed: Jun. 11, 1984

[51] Int. Cl.[4] ................................................ F24J 3/02
[52] U.S. Cl. .................................... 126/425; 126/438; 126/449; 126/432
[58] Field of Search ............... 126/438, 425, 433, 446, 126/449, 432; 165/179

[56] References Cited

U.S. PATENT DOCUMENTS

| | | | |
|---|---|---|---|
| 1,682,404 | 8/1928 | Murray et al. | 165/179 |
| 3,264,756 | 8/1966 | Fuentevilla | 165/179 X |
| 4,099,516 | 7/1978 | Caulier | 126/438 |
| 4,317,444 | 3/1982 | Maruko | 126/438 |
| 4,328,792 | 5/1982 | Shores | 126/438 |
| 4,356,812 | 11/1982 | Haven | 126/438 |
| 4,416,257 | 11/1983 | Bale | 126/438 X |

FOREIGN PATENT DOCUMENTS

| | | | |
|---|---|---|---|
| 937904 | 8/1948 | France | 126/438 |
| 2442411 | 7/1980 | France | 126/438 |

Primary Examiner—Randall L. Green
Attorney, Agent, or Firm—Harvey B. Jacobson

[57] ABSTRACT

A water-heating solar parabolic collecting and concentrating apparatus comprises a pair of inclined parabolic reflectors positioned side by side on a rotary framework with upwardly extending water-heating tubes positioned along the focal lines of the respective reflectors. The tubes are split longitudinally into forward and reverse flow water passages by vanes which also provide heat transfer enhancing fins projecting diametrically from the tubes. Inlet and outlet hoses from the respective tubes extend through a turntable base forming part of the framework on which the collectors are mounted, for rotational sun-tracking under the power of a timer-controlled electric motor.

13 Claims, 9 Drawing Figures

SOLAR PARABOLIC COLLECTOR

BACKGROUND OF THE INVENTION

This invention relates to a solar parabolic collector, more particularly for water heating, and has as an object the provision of a low cost, efficient collector of this nature, which may be adapted for tracking the sun on a time basis.

STATEMENT OF PRIOR ART

The following U.S. patents pertain to solar collecting and concentrating devices. However, none of these discloses the features of the present invention.

| | |
|---|---|
| 811,274 | Jan. 30, 1906 |
| 2,182,222 | Dec. 5, 1939 |
| 3,990,430 | Nov. 9, 1976 |
| 4,011,855 | Mar. 15, 1977 |
| 4,103,672 | Aug. 1, 1078 |
| 4,167,936 | Sept. 18, 1979 |
| 4,203,426 | May 20, 1980 |
| 4,205,659 | June 3, 1080 |
| 4,241,726 | Dec. 30, 1980 |

SUMMARY OF THE INVENTION

The invention provides a solar water-heating device comprising an elongate parabolic solar reflector mounted on an incline on a rotary frame with a water circulation tube disposed along the focal line of the reflector, whereby location of the device in suitable disposition facing the sun provides concentration of solar energy on the tube to heat water circulating therethrough. Preferably, the tube is divided longitudinally by a vane into forward and reverse flow channels connected respectively to water inlet and outlet hoses at the base of the tube, the tube having a space at its upper end for reversal of the water flow. The tube may have radially projecting external fins, preferably forming extensions of the vane, to enhance the heat transfer coefficient of the tube. The frame may be automatically rotated under the control of an automatic timer, by an electric motor, to track the sun on a day-to-day basis.

By dividing the tube with the vane, causing water to flow both in forward and reverse direction through the tube, the time available for heating water at the focal line of the collector is increased, allowing a higher temperature to be achieved. Conveniently in manufacture, the tube may, for example, be slotted longitudinally to receive the vane, which may be of sufficient width also to provide fins projecting diametrically from opposite sides of the tube.

For optimum heat transfer, compatible with most ambient conditions, it is desirable for the collector and tube to be inclined at about 47° to the horizontal. Stepped rotation of the collector to track the sun may be provided, for example, by a timer-controlled motor driving a turntable on which the collector is mounted. In one preferred form of the invention, two like collectors are arranged side by side on a common rotary frame.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
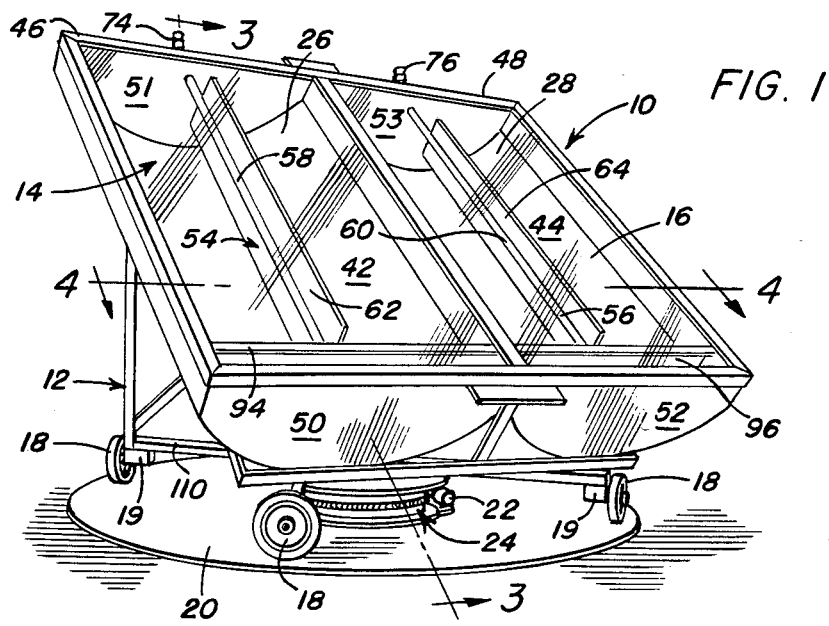
FIG. 1 is a front perspective view of a solar water heater in accordance with the invention.
Figure 6:
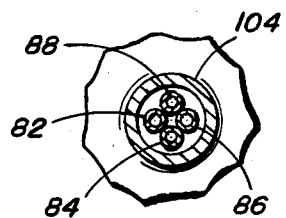
FIG. 6 is a sectional view on line 6—6 of FIG. 5.
Figure 2:
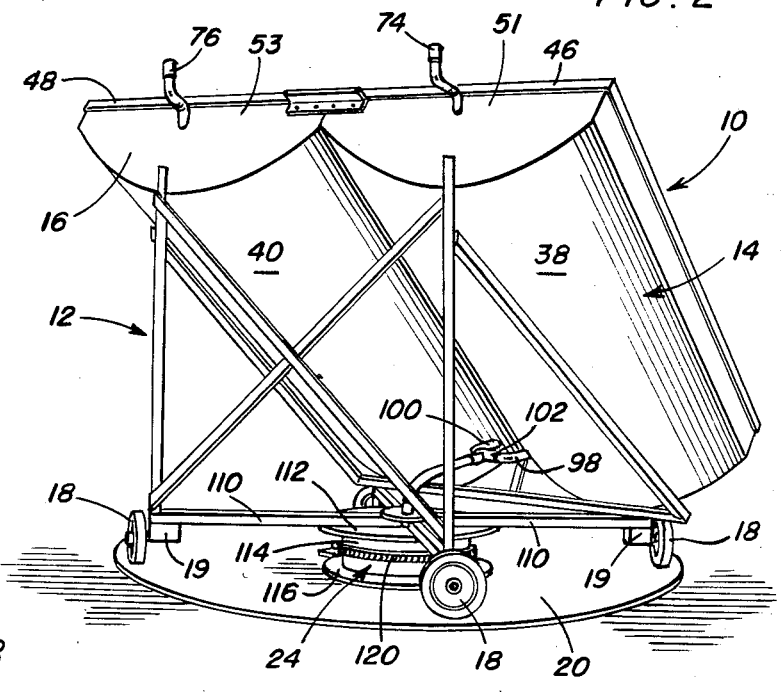
FIG. 2 is a rear perspective view of the heater.

Referring initially to FIGS. 1 and 2 in particular, a solar water heater, generally indicated 10, comprises a supporting framework 12 for a pair of inclined dished elongate parabolic solar concentrating-type heaters 14, 16 arranged side by side in inclined position on the framework so as to face the sun, the framework having circumferentially disposed wheels or casters 18 for rotatably supporting the framework on a suitable base plate 20. An electric motor 22 in combination with a turntable assembly 24 is provided for rotating the framework, as will be described, so as to enable the heaters 14, 16 to track the sun.

Figure 3:
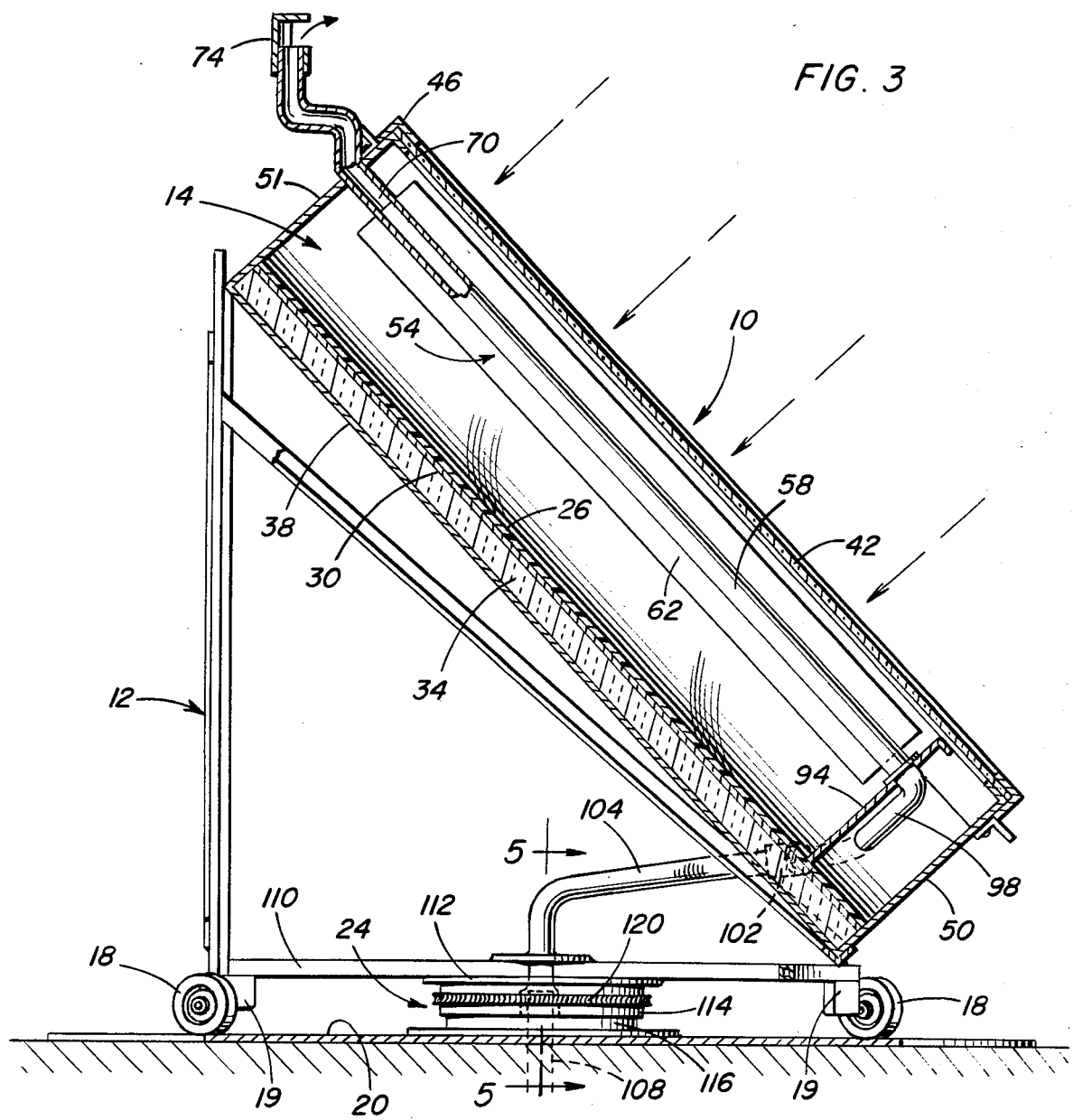
FIG. 3 is an enlarged sectional view on line 3—3 of FIG. 1.
Figure 4:
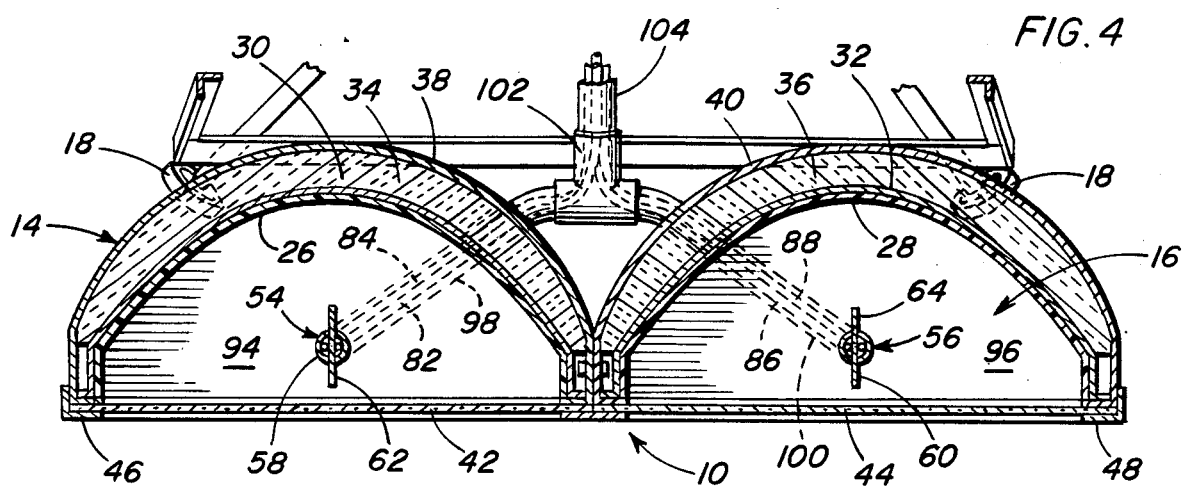
FIG. 4 is an enlarged sectional view on line 4—4 of FIG. 1.

Each of the heaters 14, 16 is of box-like form, comprising an elongate parabolic reflector having respective mirrored Mylar sheets 26, 28 (see FIGS. 3 and 4) supported in parabolic shape on metal backing sheets 30, 32 to which the Mylar sheets are adhered, sheets 30, 32 themselves being backed by fiberglass insulation 34, 36 and support plates 38, 40. At the front, the heaters are covered by respective glass plates 42, 44 in suitable support frames 46, 48, and the heaters have respective metal or the like end plates 50, 51, 52, 53. The glass plates and frames may, for example, comprise standard glass plates and frames may, for example, comprise standard ¼-inch plate, 4-foot patio doorframes and glass. The heaters are provided with heating tubes 54, 56 disposed along the focal lines of the respective parabolic reflectors, the construction of the tubes being described in more detail below.

Figure 7:
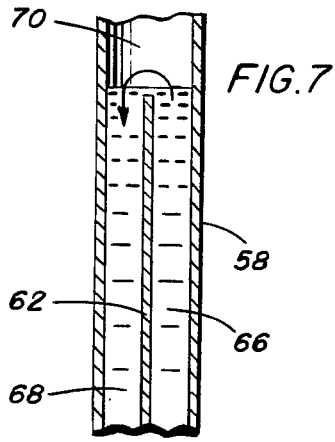
FIG. 7 is an enlarged sectional view of an upper section of one of the heating tubes of the apparatus.
Figure 8:
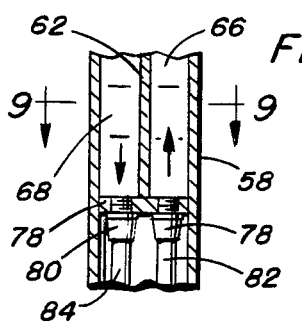
FIG. 8 is a view similar to FIG. 7 of the lower part of the tube.
Figure 9:
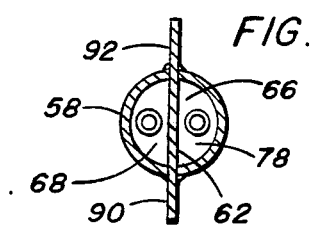
FIG. 9 is a sectional view on line 9—9 of FIG. 8.

Heating tubes 54, 56 comprise lengths of 2-inch copper pipe 58, 60 slotted lengthwise to receive vanes 62, 64 dividing the tubes into longitudinal forward flow passages and reverse flow passages. Forward flow passage 66 and reverse flow passage 68 of pipe 58 are shown in FIGS. 7 to 9, and it will be understood that like passages are formed by vane 64 in pipe 60. The vanes terminate short of the tops of the respective pipes to provide spaces, such as space 70, FIGS. 3 and 7, for reversal of the water flow. Further, the tops of the pipes are bent and provided with vent caps 74, 76 for release of water vapor and the like. At the bottom of each pipe is a base plate (as 78 in FIGS. 8 and 9) with threaded nipples, such as 78, 80 forming water inlets and outlets for connecting the pipes to flexible hoses 82, 84, 86, 88 for the supply of cold water to the respective pipes and delivery of heated water therefrom. It will be noted that vanes 62, 64 are of a width to provide diametrically opposed fins such as 90, 92, (FIG. 9) protruding from the respective pipes with the vanes and pipes being sealed by welding or the like. The fins enhance the heat transfer characteristics of the respective pipes, so as to maintain effective water heating even if the collectors are not optimally aligned in relation to the position of the sun. The tubes 54, 56 are supported in the respective heaters between end plates 50, 52 and internal supporting plates 94, 96. It will be understood that the tube design provides flow of water from the respective inlet up the forward flow passage of the respective tube and then down the reverse flow passage to the heated water outlet. Accordingly, water flowing through the tube has two passes substantially along the focal line of the respective parabolic reflector.

Hoses 82 and 84 extend through a sheath 98 and hoses 86 and 88 extend through a corresponding sheath 100, the sheaths being connected by a T-fitting 102 to common sheathing 104 for the hoses extending down through the center of turntable assembly 24, the sheathing incorporating a rotary joint 106 with a stationary hose sheath 108. The flexibility of hoses 82–88 allows the heaters to be rotated reversely through 180° for sun tracking.

Figure 5:
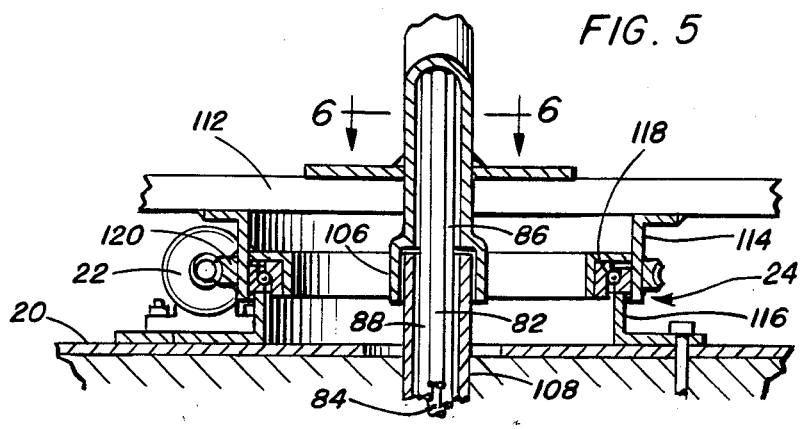
FIG. 5 is a sectional view on line 5—5 of FIG. 3.

Framework 12 may conveniently be formed of welded metal struts or the like with suitable crossbraces, and the base struts 110 may carry a central plate 112 for supporting a dependent flanged ring member 114 (FIG. 5) forming part of the turntable assembly. Heaters 14 and 16 may be supported on framework 12 by any suitable means, e.g. by welding or by means of support brackets (not shown). The heaters are inclined to the horizontal perferably at an angle of about 47° which is found to provide optimum solar heating in winter conditions compatible with good efficiency in summer. Wheels 18 may be suitably journalled in support brackets 19.

Turntable assembly 24 includes the afore-noted flanged ring member 114 supported for rotation on a similar ring member 116 attached to base plate 20 with an interposed ball bearing 118, the races of which are secured to the respective ring members. Ring member 114 has an external ring gear 120 driven by motor 22 for intermittently rotating the framework 12 for sun tracking.

Motor 22 may, for example, include a suitable reduction gear box (not shown) and may be controlled by a programmed timer to rotate the heater apparatus for say 20 seconds every 15 minutes through the day, for sun tracking, the total swing of the apparatus being through about 180°. The motor may be reversible and the programmed timer may include means for returning the apparatus to the starting position at the end of each day. Limit switches may terminate rotation of the framework at each end of its 180° travel. The timer may be fixed and set to suit the shortest day of the year.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Apparatus for the solar heating of water or the like comprising an elongate parabolic solar reflector having a focal line on which solar rays impinging on the reflector are focused, and a liquid circulation tube positioned substantially along the focal line, wherein the tube is split longitudinally by an internal vane into forward and reverse flow liquid passages, with a liquid inlet for the forward passage and a liquid outlet for the reverse passage toward one end of the tube, the vane terminating short of the other end of the tube to provide a space for reversal of liquid flow through the tube, wherein the tube has elongate heat transfer-enhancing fin means extending outwardly therefrom, wherein the reflector is supported on a frame with the tube extending upwardly and on an incline to the horizontal, wherein the frame is mounted on wheels for rotation of the reflector to attract the sun, and wherein the apparatus includes a programmable timer-controlled reversible electric motor for providing stepped rotation of the frame through the course of a day to track the sun, reverse and return of the frame to a starting position for the following day.

2. Apparatus as defined in claim 1 wherein the fin means comprises extensions of the vane.

3. Apparatus as defined in claim 1 wherein said space communicates with a vent opening at said other end of the tube.

4. Apparatus as defined in claim 1 wherein the angle of incline is about 47°.

5. Apparatus as defined in claim 1 including flexible hoses extending from the liquid inlet and outlet of the tube to accommodate 180° sun-tracking rotation of the frame.

6. Solar water heating apparatus comprising an elongate parabolic solar reflector mounted in inclined upwardly extending position on a wheeled rotary frame, the reflector being provided with an upwardly extending water-heating tube located substantially along a focal line of the reflector on which solar rays are focused, the frame including a central turntable with a ring gear and an electric motor associated with the ring gear for providing sun tracking rotation of the frame, wherein the tube is divided longitudinally by an internal vane into an upwardly extending inflow liquid passage and a downwardly extending outflow liquid passage, the lower end of the tube being provided with an inlet and an outlet for the respective passages, the upper end of the tube defining a space for the reversal of liquid flow between the passages and being extended through a top wall of the reflector where it is bent to provide a substantially vertical terminal portion defining a vent opening for the escape of vapors.

7. Apparatus as defined in claim 6 wherein the reflector and tube are inclined to the horizontal at an angle of about 47°.

8. Apparatus as defined in claim 6 wherein the vane is extended to provide external protruding fins on the tube.

9. Apparatus as defined in claim 6 wherein the inlet and outlet are connected with inlet and outlet flexible hoses.

10. Apparatus as defined in claim 9 wherein the flexible hoses from the respective cells extend down through the turntable.

11. Apparatus as defined in claim 6 wherein the reflector and tube are replicated to provide side-by-side solar heater cells on the frame.

12. Apparatus as defined in claim 11 wherein each cell is covered by a glass panel.

13. Solar water heating apparatus comprising a pair of side-by-side solar heater cells on a wheeled rotary frame including a central turntable with a ring gear, an electric motor associated with the ring gear for providing sun tracking rotation of the frame, a programmable timer for controlling operation of the motor to provide timed and stepped rotation of the frame through the course of a day to track the sun, reverse and return of the frame to a starting position for the following day, wherein each solar heating cell comprises an elongate parabolic solar reflector mounted in inclined upwardly extending position on the frame, the reflector having an upwardly extending water heating tube located substantially along a focal line of the reflector on which solar rays are focused, the tube being divided longitudinally by an internal vane into an upwardly extending inflow liquid passage and a downwardly extending outflow liquid passage, the lower end of the tube having an inlet and an outlet for the respective passages, the upper end of the tube defining a space for the reversal of liquid flow between the passages and being extended through a top wall of the respective cell where it is bent to provide a substandially vertical terminal portion defining a vent opening for the escape of vapors, the vane being extended to provide external protruding fins on the tube and wherein the inlets and outlets of the respective tubes are provided with respective flexible inlet and outlet hoses which extend outwardly through walls of the respective cells and thence down through the turntable in a common hose fitting.

* * * * *